United States Patent
Park

(10) Patent No.: US 8,466,632 B2
(45) Date of Patent: Jun. 18, 2013

(54) LED DEVICE

(75) Inventor: Sang Hyun Park, Changwon-si (KR)

(73) Assignee: LG Electronics Inc., Seoul (KR)

( * ) Notice: Subject to any disclaimer, the term of this patent is extended or adjusted under 35 U.S.C. 154(b) by 177 days.

(21) Appl. No.: 12/855,963

(22) Filed: Aug. 13, 2010

(65) Prior Publication Data

US 2011/0037418 A1    Feb. 17, 2011

(30) Foreign Application Priority Data

Aug. 13, 2009 (KR) .................. 10-2009-0074779

(51) Int. Cl.
*G05F 1/00* (2006.01)

(52) U.S. Cl.
USPC ........ 315/291; 315/209 R; 315/219; 315/224; 315/307

(58) Field of Classification Search
USPC ............. 315/205, 209 R, 219, 224, 239, 246, 315/247, 291, 307, 311
See application file for complete search history.

(56) References Cited

U.S. PATENT DOCUMENTS

| | | | | |
|---|---|---|---|---|
| 5,872,429 A * | 2/1999 | Xia et al. | ........................ | 315/194 |
| 6,020,689 A * | 2/2000 | Gradzki et al. | ................ | 315/224 |
| 6,486,616 B1 * | 11/2002 | Liu et al. | ........................ | 315/291 |
| 6,545,431 B2 * | 4/2003 | Hui et al. | ......................... | 315/291 |
| 2005/0017656 A1* | 1/2005 | Takahashi et al. | ............. | 315/248 |
| 2006/0082325 A1* | 4/2006 | Vakil et al. | ...................... | 315/224 |
| 2009/0200964 A1* | 8/2009 | King | ............................. | 315/307 |
| 2010/0060200 A1* | 3/2010 | Newman et al. | ............... | 315/307 |

* cited by examiner

*Primary Examiner* — Shawki Ismail
*Assistant Examiner* — Christopher Lo
(74) *Attorney, Agent, or Firm* — KED & Associates, LLP

(57) ABSTRACT

An LED device is provided. The LED device implements an efficient dimming operation. The LED device includes a triac dimmer for receiving an AC voltage and adjusting an angle of the AC voltage, a ballast for receiving the AC voltage from the triac dimmer and generating an AC voltage pulse, a bridge diode unit for generating a DC voltage pulse using the AC voltage pulse, an LED for receiving a DC current and emitting a light, an LED drive controller for receiving a dimming signal and controlling the DC current passing through the LED, and a dimming signal generator for receiving the AC voltage pulse from the ballast and generating a pulsating dimming signal for compensating an output of the triac dimmer and providing the dimming signal to the LED drive controller.

18 Claims, 11 Drawing Sheets

LED DEVICE

CROSS REFERENCE TO RELATED APPLICATION

Pursuant to 35 U.S.C. §119(a), this application claims the benefit of earlier filing date and right of priority to Korean Patent Application No. 10-2009-0074779, filed on Aug. 13, 2009, the contents of which are hereby incorporated by reference herein in their entirety.

BACKGROUND OF THE DISCLOSURE

1. Field of the Disclosure

The present invention relates to an LED device, and more particularly, to an LED device that implements an efficient dimming operation.

2. Discussion of the Related Art

LEDs have been used for a variety of applications owing to advantages such as high efficiency, high-speed response, long lifetime, small size, light weight, and energy saving due to low power consumption. And LEDs are environmentally friendly light sources because LEDs do not generate carbon monoxide and are also mercury free.

As luminance efficiency of LEDs has increased recently, LEDs have started to be applied to light source fields to which they have not previously been applied due to luminance constraints. However, an LED lighting device is greatly limited in use since it is generally difficult to implement a dimming function for LEDs, which are driven by current, compared to lighting devices which are driven by voltage.

Reasons why implementing a dimming function for LEDs is difficult will be described in detail with reference to the accompanying drawings.

FIG. 1 shows a block diagram illustrating an apparatus that uses a halogen lamp at an upper portion and shows an operation waveform diagram of the apparatus at a lower portion.

As shown in FIG. 1, the illumination apparatus that uses the halogen lamp includes a halogen ballast 11 that receives 220V power provided from a power source 10 and a halogen lamp 12 that receives a 12V drive voltage provided from the halogen ballast 11. As shown at the lower portion of FIG. 1, the halogen ballast 11 receives a 220V AC voltage 101 and provides an 11 kHz, 12V drive voltage 102. The halogen lamp 12 is driven with the drive voltage 102 received from the halogen ballast 11.

FIG. 2 shows a block diagram illustrating an LED device that uses an LED at an upper portion and shows an operation waveform diagram of the LED device at a lower portion.

As shown in FIG. 2, the LED device includes a halogen ballast 21 that receives 220V power provided from a power source 20 and an LED driver 22 that receives a 12V drive voltage provided from the halogen ballast 21 and drives an LED 23.

The LED driver 22 provides a constant DC current to the LED 23 to drive the LED 23. As shown at a lower portion of FIG. 2, the halogen ballast 21 receives a 220V AC voltage 201 and provides an 11 kHz, 12V drive voltage 202. The LED driver 22 generates a constant current 203 for driving the LED 23 using the 11 kHz, 12V drive voltage 202 and provides the constant current 203 to the LED 23.

FIG. 3 shows a block diagram illustrating an apparatus including a halogen lamp using a triac dimmer and shows an operation waveform diagram of the apparatus at a lower portion.

FIG. 3 illustrates the principle of a dimming operation of a halogen lamp when a widely used triac dimmer is applied to the halogen lamp. Specifically, the apparatus includes a triac dimmer 31 that receives 220V power 301 provided from a power source 30 and a halogen ballast 32 that drives a halogen lamp 33 using a drive voltage 302 provided from the triac dimmer 31. The triac dimmer 31 controls the level of an input voltage by controlling an angle of an input voltage. An intensity of light emitted from the halogen lamp 33 can efficiently be controlled by using the triac dimmer since the halogen lamp 33 is driven by voltage.

FIG. 4 is a block diagram illustrating a method of operating an LED device using a triac dimmer.

As shown in FIG. 4, the LED device includes a triac dimmer 41 that receives 220V power 401, a halogen ballast 42 that generates and provides an 11 kHz, 12V drive voltage 403 using a drive voltage 402 provided from the triac dimmer 41, an LED driver 43 that receives the drive voltage 403 provided from the halogen ballast 42 and generates a constant DC current, and an LED 44 that receives the constant DC current.

The LED device implemented as shown in FIG. 4 can not provide an efficient dimming operation of the LED 44 since the triac dimmer 41 is voltage control type and the LED driver 43 is current control type. A final drive current 404 for driving the LED 44 is pulsed and thus only appears locally. Therefore, the dimming operation of the LED is not continuous (or smooth) and the LED is turned off immediately after flickering.

To overcome this problem, there is a need to develop a new 12V halogen ballast which can implement a continuous or smooth dimming operation or to use an expensive LED driver.

SUMMARY OF THE DISCLOSURE

Accordingly, the present invention is directed to a LED device that substantially obviates one or more problems due to limitations and disadvantages of the related art.

An object of the present invention is to provide an LED device which can efficiently implement a dimming operation without a need to use a new halogen ballast or an expensive LED driver that can generate a pulse signal for dimming in case of using a conventional triac dimmer.

Additional advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an LED device according to the present invention includes a triac dimmer for receiving an AC voltage and adjusting an angle of the AC voltage, a ballast for receiving the AC voltage from the triac dimmer and generating an AC voltage pulse, a bridge diode unit for generating a DC voltage pulse using the AC voltage pulse, an LED for receiving a DC current and emitting a light, an LED drive controller for receiving a dimming signal and controlling the DC current passing through the LED, and a dimming signal generator for receiving the AC voltage pulse from the ballast and generating a pulsating dimming signal for compensating an output of the triac dimmer and providing the dimming signal to the LED drive controller.

Here, it is preferable that the dimming signal has a number of pulses corresponding to the number of times the AC voltage provided from the triac dimmer has changed from a positive level to a negative level.

In this case, the dimming signal generator may include at least one diode for removing positive components or negative components of the AC voltage pulse.

In addition, the dimming signal generator may include smoother for making the AC voltage pulse flat and maintaining a pulse height of the AC voltage pulse for a predetermined time.

Here, the smoother may include a resistor and a capacitor.

Moreover, the dimming signal generator may include a Zener diode for limiting a pulse height of the dimming signal.

In addition, the dimming signal generator may include a discharge resistor for preventing the dimming signal from being output when the AC voltage pulse is not received.

Moreover, the dimming signal generator may include a resistor for reducing an output current at an output terminal of the dimming signal generator.

The dimming signal generator may include a first resistor connected at one end thereof to a first output terminal of the ballast and a capacitor connected at one end thereof to the other end of the first resistor.

Here, the dimming signal generator may further include a diode connected at an anode thereof to a second output terminal of the ballast and connected at a cathode thereof to a ground voltage supply terminal and the other end of the capacitor.

In addition, the dimming signal generator may further include a Zener diode connected in parallel to the capacitor.

In this case, the dimming signal generator may further include a second resistor connected in parallel to the capacitor and the Zener diode.

Moreover, the dimming signal generator may further include a third resistor connected at one end thereof to the other end of the first resistor, the one end of the capacitor, one end of the Zener diode and one end of the second resistor, wherein the third resistor provides the dimming signal at the other end of the third resistor.

In this case, it is preferable that the ballast is a halogen ballast.

The LED device may further include a MOS transistor for receiving a control signal from the LED drive controller and allowing the DC current to flow through the at least one LED.

Here, the LED drive controller may generate the control signal for driving the MOS transistor by combining signals based on the dimming signal received from the dimming signal generator and the DC current received from the bridge diode unit.

In another aspect of the present invention, an LED device includes a triac dimmer for receiving an AC voltage and adjusting an angle of the AC voltage, a DC current generator for receiving the AC voltage from the triac dimmer and generating a DC current, at least one LED for receiving the DC current and emitting a light, an LED drive controller for receiving a dimming signal and controlling the DC current passing through the at least one LED, and a dimming signal generator for receiving an AC voltage pulse from the DC current generator and generating a pulsating dimming signal for compensating an output of the triac dimmer and providing the dimming signal to the LED drive controller.

Here, the dimming signal may have a number of pulses corresponding to the number of times the AC voltage provided from the triac dimmer has changed from a positive level to a negative level.

In addition, the dimming signal generator may include a first resistor connected at one end thereof to a first output terminal of the ballast, a diode connected at an anode thereof to a second output terminal of the ballast and connected at a cathode thereof to a ground voltage supply terminal, a capacitor connected to the other end of the first resistor and to the cathode of the diode, a Zener diode connected in parallel to the capacitor, a second resistor connected in parallel to the capacitor, and a third resistor connected at one end thereof to the other end of the first resistor and providing the dimming signal at the other end of the third resistor.

Accordingly, the present invention provides the following effects and/or advantages.

First of all, the LED device according to the present invention can efficiently implement a dimming function without flickering in case of using a triac dimmer.

Secondly, according to the present invention, it is possible to efficiently implement a dimming function in an LED device at a low price without using expensive parts.

Thirdly, various types of widely used illumination devices can be easily replaced with LED devices according to the present invention.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DESCRIPTION OF SPECIFIC EMBODIMENTS

Preferred embodiments of the present invention will now be described in detail with reference to the accompanying drawings. However, the present invention may be embodied in many different forms and should not be construed as limited to the illustrated embodiments set forth herein. Rather, the illustrated embodiments are provided so that this disclosure will be thorough and complete, and will fully convey the scope of the invention to those skilled in the art. Wherever possible, the same reference numbers will be used throughout the drawings to refer to the same or like parts.

Figure 1:
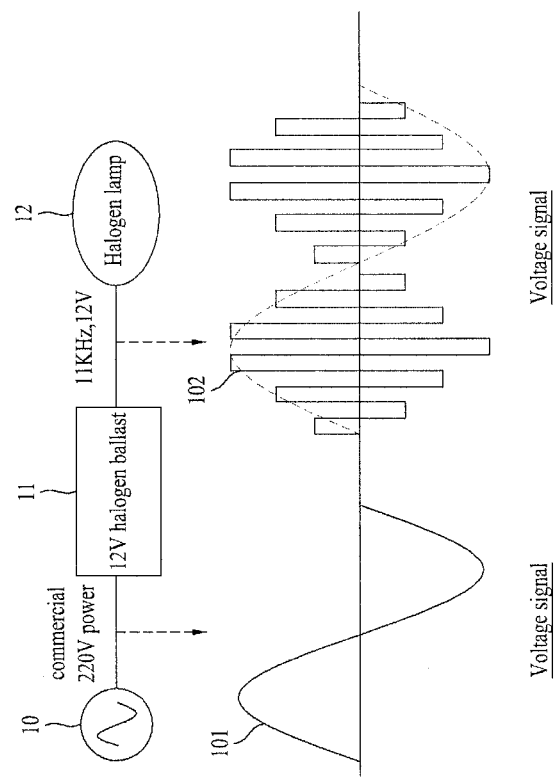
FIG. 1 is a block diagram illustrating an apparatus that uses a halogen lamp.
Figure 2:
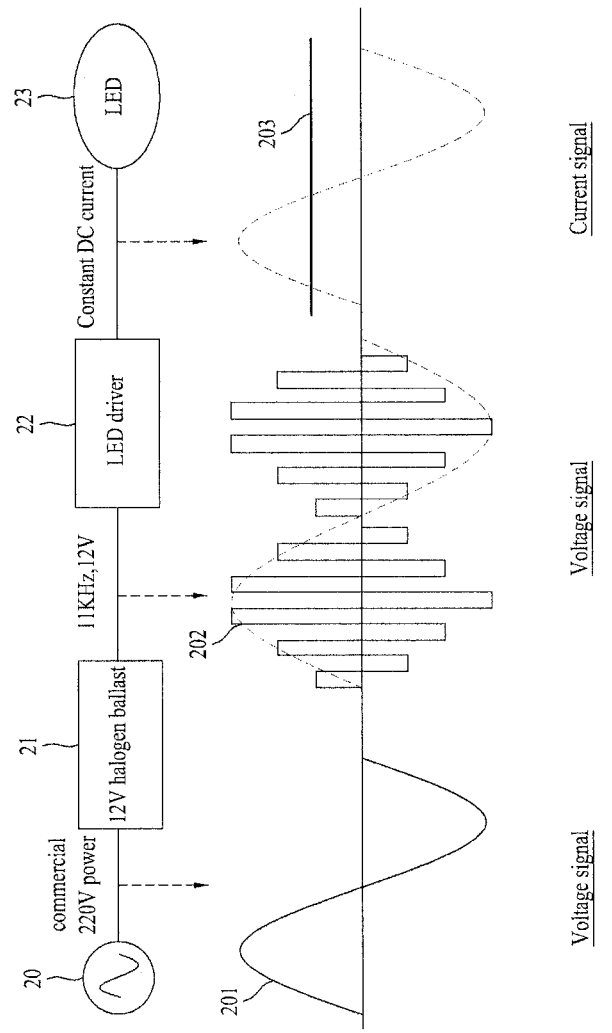
FIG. 2 is a block diagram illustrating an LED device that uses an LED.
Figure 3:
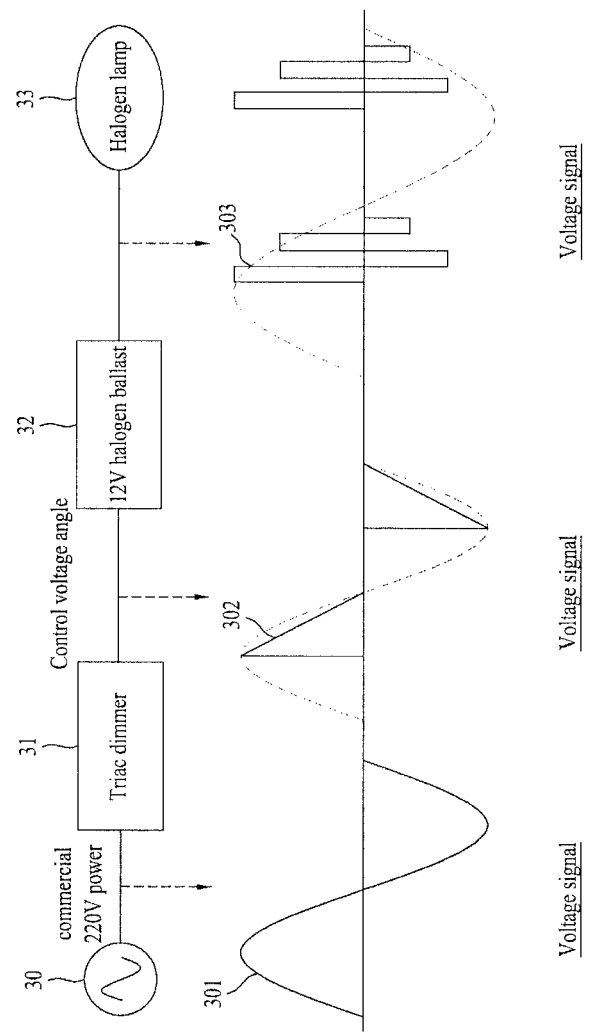
FIG. 3 is a block diagram illustrating an apparatus including a halogen lamp using a triac dimmer.
Figure 4:
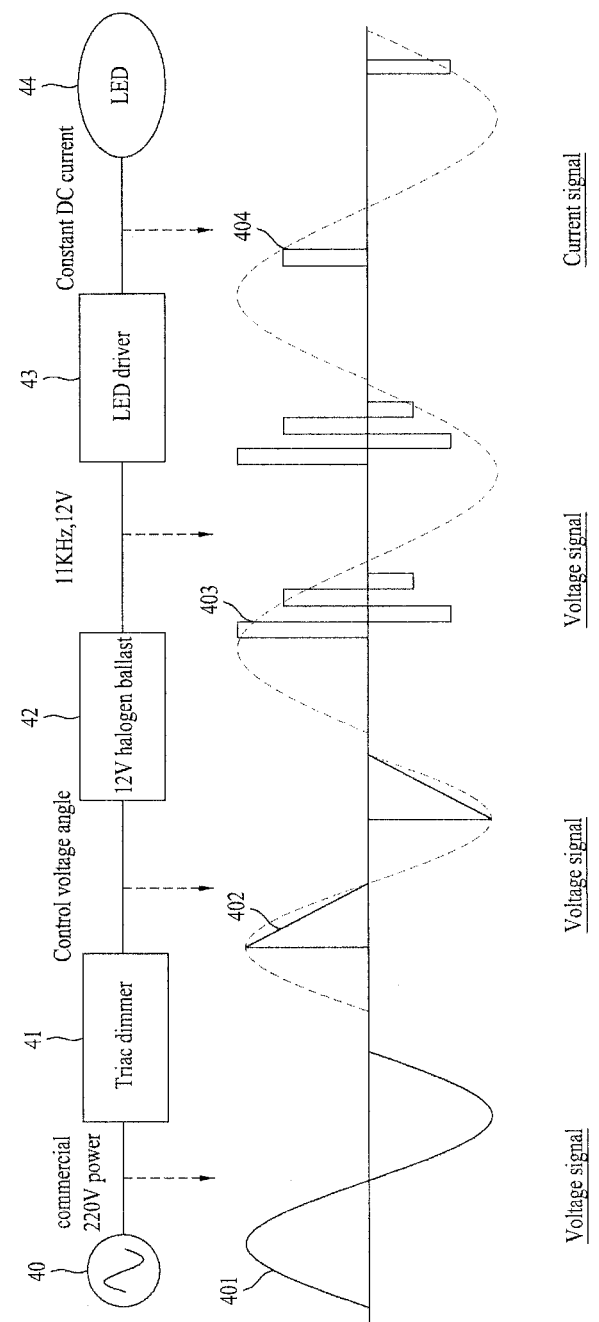
FIG. 4 is a block diagram illustrating a method of operating an LED device using a triac dimmer.
Figure 5:
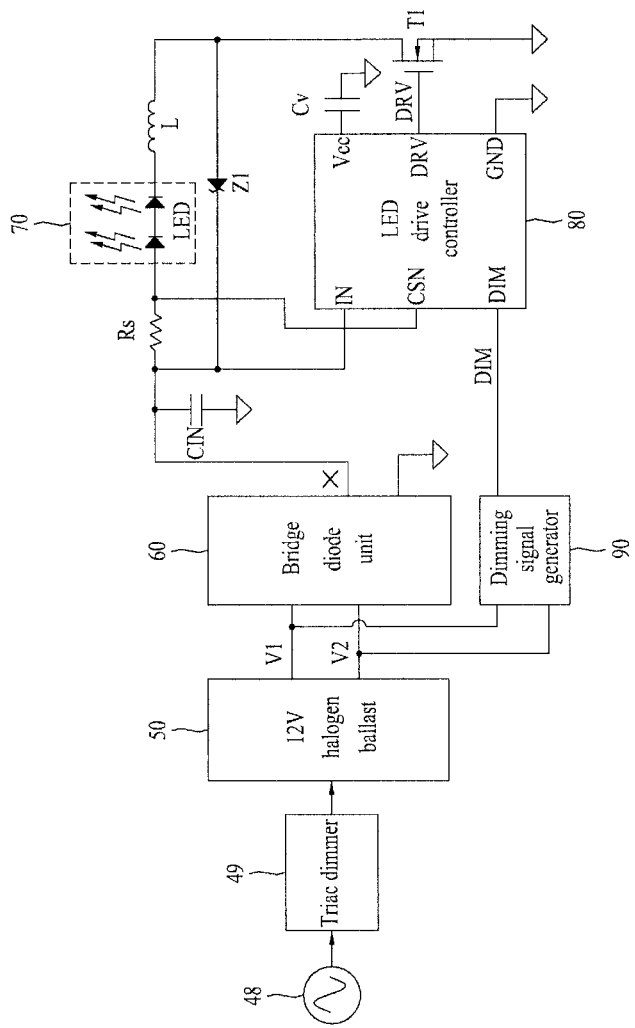
FIG. 5 is a block diagram illustrating an LED device according to a preferred embodiment of the present invention.

FIG. 5 is a block diagram illustrating an LED device according to a preferred embodiment of the present invention.

As shown in FIG. 5, the LED device according to this embodiment may include a triac dimmer 49, a ballast 50, a bridge diode unit 60, at least one LED 70, an LED drive controller 80, a dimming signal generator 90, a MOS transistor T1, a resistor Rs, capacitors Cin and Cv, an inductor L, and a ZENER DIODE Z1.

The triac dimmer receives an AC voltage and adjusts an angle of the AC voltage. More specifically, the triac dimmer 49 receives an AC voltage provided from a power source and adjusts the angle of the voltage and outputs the resulting AC voltage to the halogen ballast 50.

The ballast 50 receives the AC voltage provided by the triac dimmer 49 and generates AC voltage pulses for generating a DC current to be supplied to the at least one LED 70 and outputs the AC voltage pulses through first and second output terminals V1 and V2. The ballast 50 may be a halogen ballast. Here, it is assumed that the halogen ballast 50 generates a 12V AC voltage pulse.

The bridge diode unit 60 generates a DC voltage pulse to be supplied to the at least one LED 70 using the AC voltage pulse.

Because the ballast 50 receives the AC voltage and the bridge diode unit 60 supplies the DC voltage pulse to the at least one LED 70 using the output of the ballast 50 such that a DC current is provided to the at least one LED 70, the ballast 50 and the bridge diode unit 60 can be called to a DC current generator.

The at least one LED 70 receives the DC current and emits a light.

The dimming signal generator 90 receives the AC voltage pulses output from the halogen ballast 50 and generates a pulsating dimming signal DIM.

The LED drive controller 80 receives an output of the bridge diode unit 60 and the dimming signal DIM and controls the DC current passing through the at least one LED 70. Specifically, the LED drive controller 80 generates a control signal for controlling the MOS transistor T1 and the MOS transistor T1 receives the control signal through its gate and allows the DC current to flow from the at least one LED 70 to a ground voltage supply terminal.

The capacitor Cin functions to achieve voltage stability of a node that provides the DC current and the capacitor Cv functions to achieve voltage stability of a power source terminal of the LED drive controller 80.

The ZENER DIODE Z1 functions to limit the level of voltage applied across both ends of the ZENER DIODE Z1.

When the DC current is input to the LED drive controller 80 through an input terminal IN and an activated dimming signal is input thereto through a dimming terminal DIM, the LED drive controller 80 generates the control signal for turning on the MOS transistor T1.

The triac dimmer 49 is voltage-control type and the LED drive controller 80 is current-control type. Thus, to perform efficient dimming, information indicating a decrease in the voltage when controlled by the triac dimmer 49 needs to be provided to the LED drive controller 80.

The LED device according to this embodiment is constructed such that the halogen ballast 50 outputs AC pulses using an AC voltage signal provided from the triac dimmer 49, a dimming signal is generated using the AC pulses provided from the halogen ballast 50 and the dimming signal is input to the LED drive controller 80. As a result, voltage information of the triac dimmer 49 can be added to current information provided to the LED drive controller 80 for generating the dimming signal.

Figure 6:
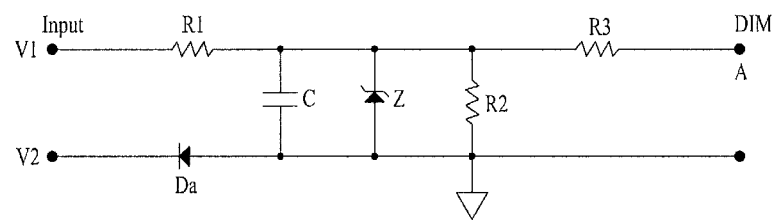
FIG. 6 is a circuit diagram illustrating the dimming signal generator shown in FIG. 5.

FIG. 6 is a circuit diagram illustrating the dimming signal generator shown in FIG. 5.

The dimming signal generator 90 according to this embodiment receives the AC voltage pulse from the ballast 50, generates a pulsating dimming signal DIM for compensating an output of the triac dimmer 49, and provides the dimming signal DIM to the LED drive controller 80.

As shown in FIG. 6, the dimming signal generator 90 may include a first resistor R1, a diode Da, a capacitor C, a Zener diode Z, a second resistor R2, and a third resistor R3. One end of the first resistor R1 is connected to a first output terminal V1 of the halogen ballast 50. One end of the capacitor C is connected to the other end of the first resistor R1. An anode of the diode Da is connected to a second output terminal V2 of the halogen ballast 50 and a cathode thereof is connected to the ground voltage supply terminal and the other end of the capacitor C. The Zener diode Z is connected in parallel with the capacitor C. The second resistor R2 is also connected in parallel with the capacitor C and the Zener diode Z. One end of the third resistor R3 is connected to the other end of the first resistor R1 and the other end thereof provides a dimming signal DIM. And the one end of the third resistor R3 is connected to the one end of the capacitor C, one end of the Zener diode Z and one end of the second resistor R2.

The dimming signal DIM generated by the dimming signal generator 90 is characterized in that it includes information associated with the decrease of the voltage of the AC voltage pulses provided from the halogen ballast 50. That is, the dimming signal DIM includes information indicating that the signal output from the triac dimmer 49 is changed from positive to negative. In a specific example, the dimming signal DIM has a number of pulses corresponding to the number of times the AC voltage provided from the triac dimmer 49 has changed from a negative level to a positive level.

The resistor R1 and the capacitor C makes the AC voltage pulse flat and maintains a pulse height of the AC voltage pulse for a predetermined time. That is, the resistor R1 and the capacitor C smoothes the AC voltage pulse. Thus, the resistor R1 and the capacitor C can be called to smoother. Since the dimming signal generator 90 according to this embodiment uses only positive components of the AC voltage pulses input to the dimming signal generator 90 by removing negative components of the AC voltage pulses using a single diode, the dimming signal generator 90 uses the resistor R1 and the capacitor C to fill the empty portions of the signal to smooth the signal.

The Zener diode Z is provided to limit the pulse height of the dimming signal DIM. That is, the Zener diode Z limits the voltage level of the dimming signal DIM provided to the LED drive controller 80.

The second resistor R2 prevents the dimming signal DIM from being output when the AC voltage pulse is not received. That is, the second resistor R2 is a discharge resistor which maintains the voltage of a node A at "0" during a section in which no input signal is received from the halogen ballast 50. It is preferable that the resistance of the second resistor R2 be as small as possible in order to reduce the discharge time.

The third resistor R3 is provided to reduce an output current at an output terminal of the dimming signal generator 90. That is, the third current R3 limits current flowing into the dimming signal input terminal of the LED drive controller 80.

The dimming signal generator 90 may include at least one diode for removing positive components or negative components of the AC voltage pulse. The dimming signal generator 90 according to this embodiment removes the negative components of the AC voltage pulses provided from the halogen ballast 50 using the single diode Da. The dimming signal generator 90 may also include a circuit such as a bridge diode to generate positive signals from negative sections of input signals. In this case, the dimming signal generator 90 requires many diodes. Thus, in this embodiment, the dimming signal generator 90 is implemented so as to obtain only a half section of the input signal using the single diode Da.

Figure 7:
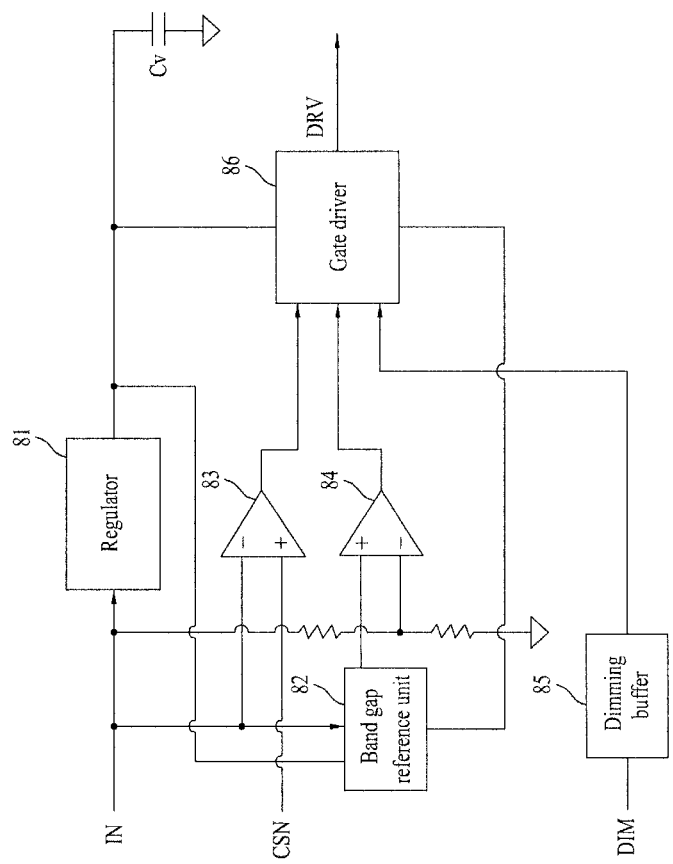
FIG. 7 is a block diagram illustrating the LED drive controller shown in FIG. 5.

FIG. 7 is a block diagram illustrating the LED drive controller shown in FIG. 5.

As shown in FIG. 7, the LED drive controller 80 may include a regulator 81, a band gap reference unit 82, comparators 83 and 84, a dimming buffer 85, and a gate driver 86. The regulator 81 provides a voltage at a specific level corresponding to an input signal IN. The band gap reference unit 82 receives a signal provided from the regulator 81 and generates a reference voltage. The comparator 83 compares the input signal IN with an input signal CSN. The comparator 84 compares the input signal CSN with the reference signal provided from the band gap reference unit. The dimming buffer 85 buffers and outputs a dimming signal. The gate driver 86 combines signals output from the two comparators 83 and 84 and a signal output from the dimming buffer 85 and generates a control signal DRV to drive the MOS transistor T1. Specifically, the gate driver 86 activates the control signal DRV when the signals output from the two comparators 83 and 84 and the dimming buffer 85 are all active.

In this manner, the LED drive controller 80 generates a control signal for driving the MOS transistor T1 by combining signals based on the dimming signal DIM received from the dimming signal generator 90 and the DC current received from the bridge diode unit 60.

Figure 8:
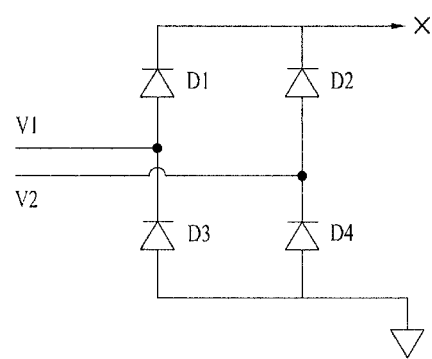
FIG. 8 is a circuit diagram illustrating the bridge diode unit shown in FIG. 5.

FIG. 8 is a circuit diagram illustrating the bridge diode unit shown in FIG. 5.

As shown in FIG. 8, the bridge diode unit 60 may include four diodes D1 to D4. The bridge diode unit 60 receives 12V AC voltage pulses output from the halogen ballast 50 and generates a DC voltage pulse to be provided to the at least one LED 70.

Figure 9:
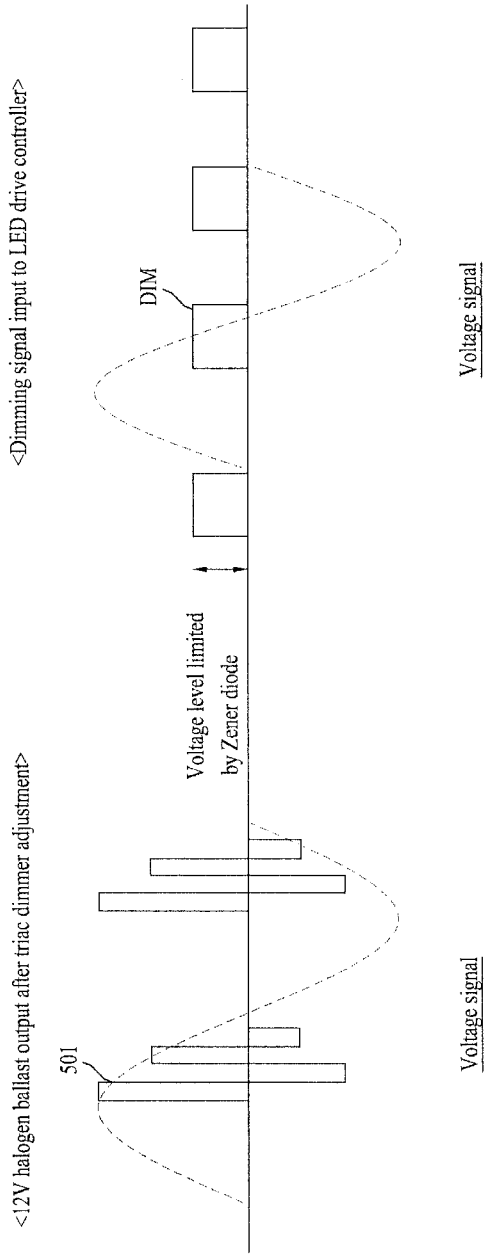
FIGS. 9 and 10 are waveform diagrams illustrating the operation of the LED device shown in FIG. 5.
Figure 10:
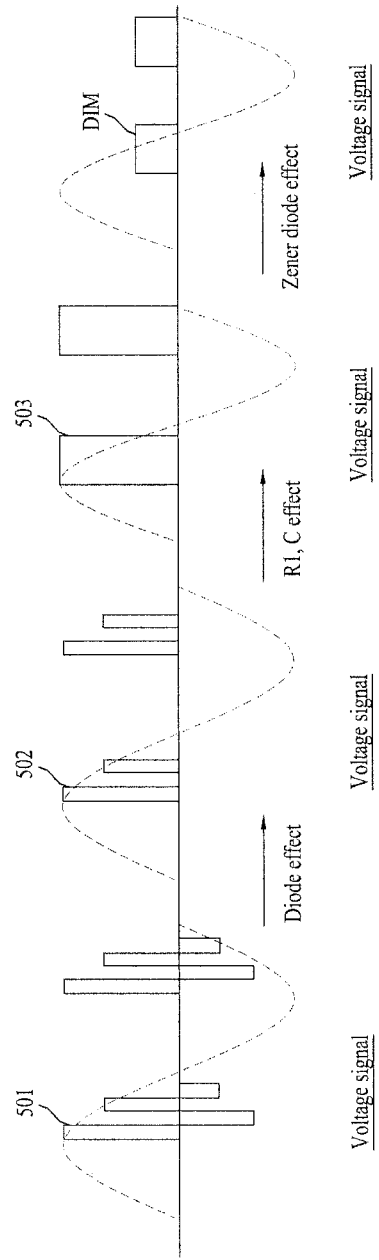

FIGS. 9 and 10 are waveform diagrams illustrating the operation of the LED device shown in FIG. 5.

A left portion of FIG. 9 shows AC voltage pulses 501 that the halogen ballast 50 generates from a signal received from the triac dimmer 49. A right portion of FIG. 9 shows a dimming signal DIM input to the LED drive controller 80. The level of the dimming signal DIM is limited by the Zener diode as shown in FIG. 9.

FIG. 10 illustrates a detailed operation of the dimming signal generator 90.

The diode Da in the dimming signal generator 90 removes negative sections of the AC voltage pulses 501 output from the halogen ballast 50, leaving only positive sections 502. Then, the resistor R1 and the capacitor C, which constitute the smoother, smooth the signal 502 and the Zener diode Z limits the level of the dimming signal DIM.

Figure 11:
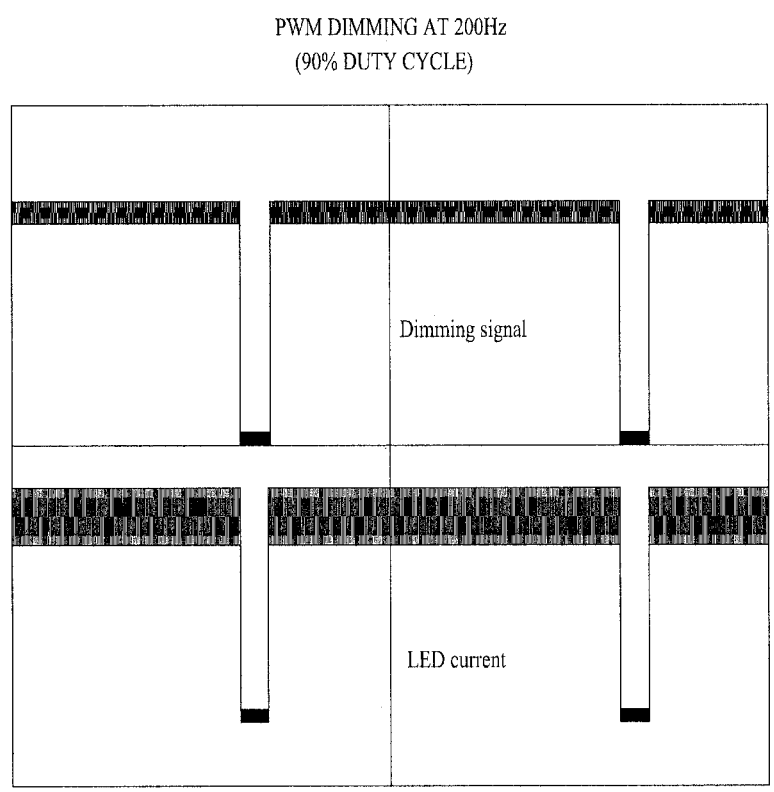
FIG. 11 is a simulation waveform diagram illustrating the operation of the LED device shown in FIG. 5.

FIG. 11 is a simulation waveform diagram illustrating the operation of the LED device shown in FIG. 5.

Specifically, FIG. 11 illustrates simulation waveforms of the dimming signal and a current flowing through the at least one LED. To implement a dimming operation of an LED string, there is a need to provide a pulsate signal to the LED drive controller. However, it is generally difficult to provide a pulsating dimming signal to the LED drive controller.

It is difficult to add a pulse signal generator to an LED lamp that is manufactured to replace the conventional incandescent and fluorescent lamps. A device for generating pulse signals is relatively expensive and is not easily attached to the lamp. The pulse signal generation device should be able to be mounted to a location at which the lamp is mounted. However, it is difficult to attach the pulse signal generation device to such a location at which the lamp is mounted.

However, the LED device according to this embodiment internally generates a pulsating dimming signal through the dimming signal generator 90 which is constructed of relatively simple circuitry, thereby not increasing manufacturing costs.

Various embodiments have been described in the best mode for carrying out the invention.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A light emitting device (LED) device comprising:
at least one LED;
a triac dimmer for receiving an AC voltage and adjusting an angle of the AC voltage;
a ballast for receiving the adjusted AC voltage from the triac dimmer and for generating an AC voltage pulse;
a bridge diode unit for generating a DC voltage pulse to be supplied to the at least one LED by using the AC voltage pulse and such that a DC current is provided to the at least one LED;
a dimming signal generator for receiving the AC voltage pulse from the ballast and for generating a pulsating dimming signal for compensating an output of the triac dimmer, wherein the dimming signal generator includes a Zener diode for limiting a pulse height of the dimming signal, and wherein the Zener diode is connected between a first output terminal of the ballast and a second output terminal of the ballast; and
an LED drive controller for receiving the pulsating dimming signal and for controlling the DC current passing through the at least one LED such that the adjusted AC voltage of the triac dimmer is applied to the DC current provided to the LED drive controller for generating the pulsating dimming signal.

2. The LED device according to claim 1, wherein the dimming signal has a number of pulses corresponding to a number of times the AC voltage provided from the triac dimmer has changed from a positive level to a negative level.

3. The LED device according to claim 1, wherein the dimming signal generator includes at least one diode for removing positive components or negative components of the AC voltage pulse.

4. The LED device according to claim 1, wherein the dimming signal generator includes a smoother for making the AC voltage pulse flat and maintaining a pulse height of the AC voltage pulse for a predetermined time.

5. The LED device according to claim 4, wherein the smoother includes a resistor and a capacitor.

6. The LED device according to claim 1, wherein the dimming signal generator includes a discharge resistor for preventing the dimming signal from being output when the AC voltage pulse is not received from the ballast.

7. The LED device according to claim 1, wherein the dimming signal generator includes a resistor for reducing an output current at an output terminal of the dimming signal generator.

8. The LED device according to claim 1, wherein the dimming signal generator includes:
a first resistor connected at a first end of the first resistor to a first output terminal of the ballast; and a capacitor connected at a first end of the capacitor to a second end of the first resistor.

9. The LED device according to claim 8, wherein the dimming signal generator further includes a diode connected at an anode thereof to a second output terminal of the ballast and connected at a cathode thereof to a ground voltage supply terminal and a second end of the capacitor.

10. The LED device according to claim 9, wherein the dimming signal generator further includes a Zener diode connected in parallel to the capacitor.

11. The LED device according to claim 10, wherein the dimming signal generator further includes a second resistor connected in parallel to the capacitor and the Zener diode.

12. The LED device according to claim 11, wherein the dimming signal generator further includes a third resistor connected at a first end of the third resistor to the second end of the first resistor, the first end of the capacitor, one end of the Zener diode and one end of the second resistor, the third resistor to provide the dimming signal at a second end of the third resistor.

13. The LED device according to claim 1, wherein the ballast is a halogen ballast.

14. The LED device according to claim 1, further comprising a MOS transistor for receiving a control signal from the LED drive controller and allowing the DC current to flow through the at least one LED.

15. The LED device according to claim 14, wherein the LED drive controller generates the control signal for driving the MOS transistor by combining signals based on the pulsating dimming signal received from the dimming signal generator and the DC voltage pulse received from the bridge diode unit.

16. The LED device according to claim 1, wherein the dimming signal generator includes:
a first resistor connected at a first end of the first resistor to a first output terminal of the ballast;
a diode connected at an anode of the diode to a second output terminal of the ballast and connected at a cathode of the diode to a ground voltage supply terminal;
a capacitor connected to a second end of the first resistor and to the cathode of the diode;
a Zener diode connected in parallel to the capacitor;
a second resistor connected in parallel to the capacitor; and
a third resistor connected at a first end of the third resistor to the second end of the first resistor and providing the dimming signal at a second end of the third resistor.

17. The LED device according to claim 1, wherein the dimming signal generator further includes:
a first resistor connected to the first output terminal of the ballast; and
a capacitor connected to the first resistor,
wherein the capacitor is connected in parallel to the Zener diode.

18. A light emitting device (LED) device comprising:
at least one LED;
a triac dimmer for receiving an AC voltage and adjusting an angle of the AC voltage;
a ballast for receiving the adjusted AC voltage from the triac dimmer and for generating an AC voltage pulse;
a bridge diode unit for generating a DC voltage pulse to be supplied to the at least one LED using the AC voltage pulse and such that a DC current is provided to the at least one LED;
a dimming signal generator for receiving the AC voltage pulse from the ballast and for generating a pulsating dimming signal for compensating an output of the triac dimmer, wherein the dimming signal generator includes a first resistor connected at a first end of the first resister to a first output terminal of the ballast, and a capacitor connected at a first end of the capacitor to a second end of the first resistor; and
an LED drive controller for receiving the pulsating dimming signal and for controlling the DC current passing through the at least one LED such that the adjusted AC voltage of the triac dimmer is applied to the DC current provided to the LED drive controller for generating the pulsating dimming signal.

* * * * *